(12) United States Patent
Cordell

(10) Patent No.: US 8,715,383 B2
(45) Date of Patent: May 6, 2014

(54) METHOD AND APPARATUS FOR APPLYING AIR FILTERS

(76) Inventor: Ray Cordell, Tampa, FL (US)

( * ) Notice: Subject to any disclaimer, the term of this patent is extended or adjusted under 35 U.S.C. 154(b) by 360 days.

(21) Appl. No.: 13/214,914

(22) Filed: Aug. 22, 2011

(65) Prior Publication Data

US 2012/0047859 A1    Mar. 1, 2012

Related U.S. Application Data

(60) Provisional application No. 61/376,436, filed on Aug. 24, 2010.

(51) Int. Cl.
*B01D 46/00* (2006.01)

(52) U.S. Cl.
USPC .................. 55/495; 55/491; 55/493; 55/507; 55/509; 55/511; 95/273; 52/506.07

(58) Field of Classification Search
USPC ........... 55/490, 493, 495, 504, 507, 508, 511, 55/491, 509; 52/506.07; 95/273
See application file for complete search history.

(56) References Cited

U.S. PATENT DOCUMENTS

| | | | |
|---|---|---|---|
| 3,250,063 A | 5/1966 | Andrews | |
| 3,760,568 A | 9/1973 | Neumann et al. | |
| 3,834,106 A * | 9/1974 | Astedt et al. | 52/506.07 |
| 3,875,717 A * | 4/1975 | Moeller | 52/506.08 |
| 4,009,012 A | 2/1977 | Heffler | |
| 4,408,428 A * | 10/1983 | Brooke et al. | 52/506.07 |
| 4,858,408 A * | 8/1989 | Dunn | 52/506.07 |
| 4,873,809 A * | 10/1989 | Paul | 52/506.07 |
| 5,033,247 A * | 7/1991 | Clunn | 52/506.08 |
| 5,690,719 A | 11/1997 | Hodge | |
| 7,062,886 B2 * | 6/2006 | Auriemma | 52/506.07 |
| 7,647,739 B2 | 1/2010 | Boyd | |

* cited by examiner

*Primary Examiner* — Robert Clemente
(74) *Attorney, Agent, or Firm* — Larson & Larson, P.A.; Frank Liebenow; Justin Miller

(57) ABSTRACT

A filter clip for holding a filter media over a supply/return/exhaust of an HVAC system includes a hook portion that secures to a grid of a suspended ceiling system and a filter holding portion that is connected to the hook portion such that the filter holding portion is biased towards the grid and/or a grille. An air filter placed between the filter holding portion and the grid and/or grille is held against the grid and/or grill until, for example, until construction is complete or the filter needs to be changed or removed, thereby covering the supply/return and reducing contamination of the HVAC system from construction dirt/debris.

20 Claims, 4 Drawing Sheets

METHOD AND APPARATUS FOR APPLYING AIR FILTERS

CROSS-REFERENCE TO RELATED APPLICATION

This application is a non-provisional application taking priority from U.S. provisional patent application Ser. No. 61/376,436, filed Aug. 24, 2010, the disclosure of which is hereby incorporated by reference.

FIELD

This invention relates to the field of building construction and more particularly to an apparatus for filtering air to prevent contamination from entering or being discharged from ducts, grilles, etc.

BACKGROUND

During construction, the exterior of many buildings is completed before the interior. Thus the exterior work can be completed during better weather conditions and finishing work, walls, duct work, electrical, molding, floors, etc. can be completed in weather that would have been too hot, too cold, too wet, etc. Often, heating and/or ventilation and/or air conditioning systems (hereafter referred to as HVAC systems) are installed before the walls and ceilings are in place.

During new construction and/or remodeling, once a substantial portion of the structure is intact and some or all of the windows/doors are installed, the building is substantially closed (i.e. sealed except for windows and doors that may be open). Once the building is substantially closed, the HVAC system is often run to heat, cool or ventilate the building to condition and/or dehumidify air while workers complete the interior components of the newly constructed or remodeled building. This is fine for the workers, but work being performed within the building often creates issues with the HVAC system because contaminants such as general construction dust, dirt, concrete dust, drywall dust, wood dust, carpet fibers, ceiling tile fibers, composites dust, insulation, etc, are drawn into the HVAC duct and travel to the air conditioning equipment. The contaminants often settle in the duct work and/or pass through to the air conditioning equipment. In addition, dust that may occur from the HVAC installation process is often drawn into equipment or discharged to other interior building spaces, possibly building spaces that have already been completed (i.e. carpeted, furniture installed). Lately, some building guidelines or regulations now require that the HVAC system be free of such contaminants. Even without guidelines and regulations, it is undesirable to leave such contaminants within the duct/air conditioning system for long periods of time because they provide a breading ground for bacteria, mold, and odor, they randomly dislodge from the ducts and are emitted into the building air, they collect around various HVAC components (e.g. baffles, flaps, dampers, sensing devices) leading to failures of those components, etc.

Due to the length of duct runs, turns, elbows, dampers, etc., it is often impractical to clean the ducts and air conditioning system after the construction is complete. Therefore, it is better to prevent contamination of the ducts/air conditioning system during construction.

To combat the introduction of contaminants into the HVAC system and eventual discharge from such, builders have resorted to covering the return, exhaust, ventilation grilles with filters or filter media. This reduces contamination of the ducts, fans, and heat exchanger, but often the mechanisms for attaching the filters or filter media to the grilles damages the grille, grid system or ceiling tiles. For example, builders have used tape or wire ties to hold the filters or filter media to the grilles. This often results in marring and/or scratching of the grille or grid system, or the tape leaves residue or potentially pulls paint off of the grille or grid system. Furthermore, using these methods, the filter or filter media often sags, leaving large gaps where unfiltered air containing contaminants is free to flow into the ducts and eventually into the equipment (e.g. air handler) and in some cases pass through to the interior building space. In some cases, the filter or media falls off. Such make-shift attempts to prevent debris from entering the HVAC systems are only partially effective.

What is needed is a device that attaches to the grid system and tightly holds a filter or filter media against the grille and/or grid, without damaging the grid system or grille.

SUMMARY

In one embodiment, a filter clip is disclosed including a hook portion that secures to a grid/grille of a suspended ceiling system and a filter holding portion that is resiliently connected to the hook portion such that the filter holding portion is resiliently biased towards the grid/grille. An air filter placed between the filter holding portion and the grid/grille is held against the grid/grille until, for example, changing of the filter is required or construction is complete.

In another embodiment, a method of holding an air filter to a grid/grille of a suspended ceiling system is disclosed including providing a clip that has a hook portion for securing the clip to the grid/grille of the suspended ceiling system and a filter holding portion that is resiliently connected to the hook portion such that the filter holding portion is resiliently biased towards the grid/grille when installed. The method includes installing two or more of the clips onto the grid/grille of the suspended ceiling system then, for each clip, pulling the filter holding portion away from the grid/grille then inserting the air filter between the filter holding portion and the grid and/or grille; and releasing the filter holding portion, thereafter the filter holding portion is biased towards the grid and/or grille, holding the air filter against the grid and/or grille.

In another embodiment, a filter clip is disclosed including a hook portion. The hook portion clips over a base of a grid of a suspended ceiling system securing to the base of the grid. The filter clip has a filter holding portion that is resiliently connected to the hook portion such that the filter holding portion is resiliently biased towards the hook portion. A surface of the filter holding portion that faces the hook portion is jagged for holding a filter media between the grid/hook portion and the surface. The filter media is placed between the surface of the filter holding portion and the grid and held between such until manually removed.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
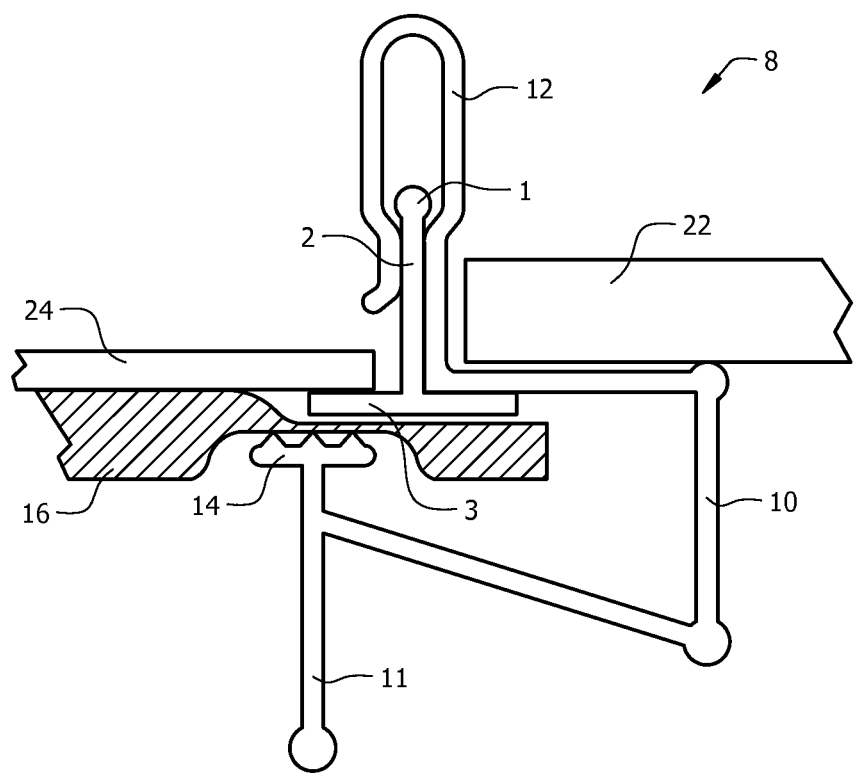
FIG. 1 illustrates a cross-sectional view of a first exemplary filter clip.

Reference will now be made in detail to the presently preferred embodiments of the invention, examples of which are illustrated in the accompanying drawings. Throughout the following detailed description, the same reference numerals refer to the same elements in all figures.

Figure 4:
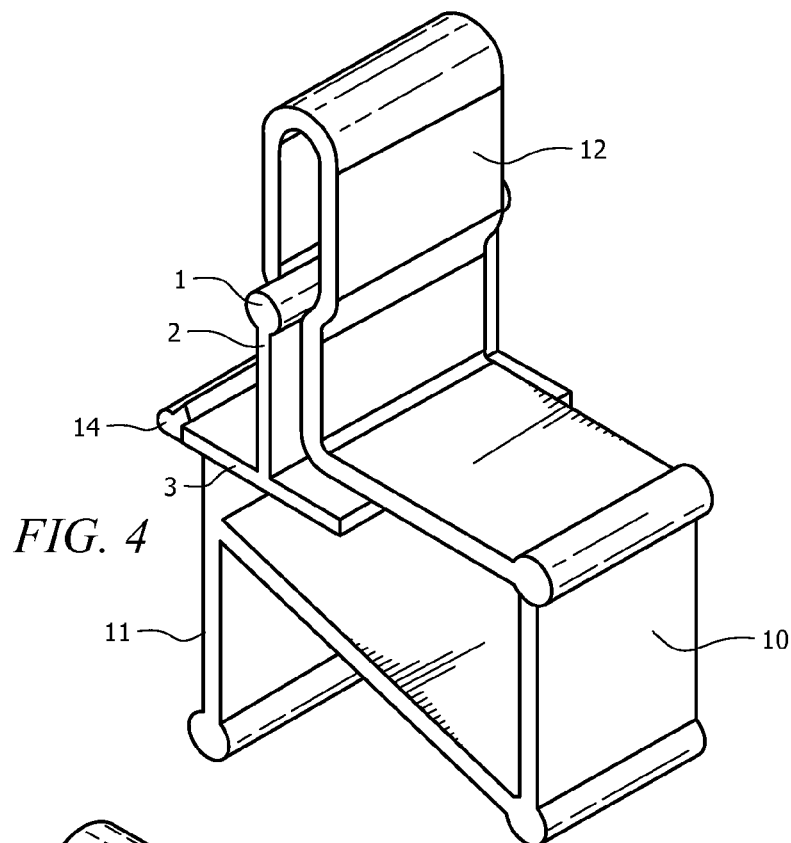
FIG. 4 illustrates a perspective view of the first exemplary filter clip.
Figure 5:
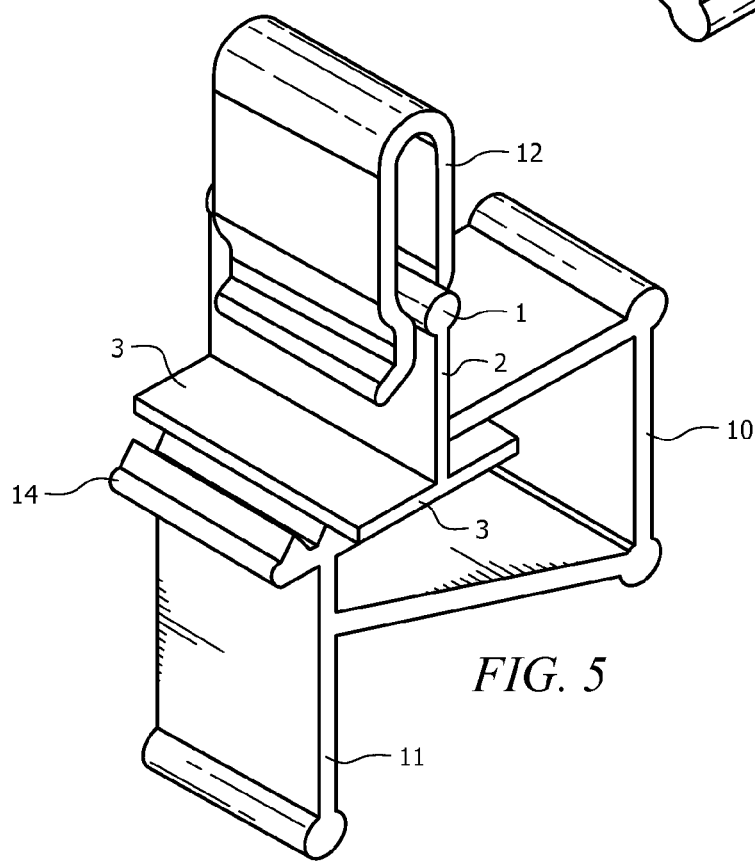
FIG. 5 illustrates a second perspective view of the first exemplary filter clip.

Referring to FIGS. 1, 4 and 5 a first exemplary filter clip 8 will be described. Of particular concern is HVAC intake vents, though HVAC outflow vents are also of concern. HVAC system vents are often located in ceilings, especially for cooling where warm air stratifies closer to the ceiling. The vents typically terminate in grilles or deflectors. In many buildings, the HVAC ducts are run through the ceiling between a dropped ceiling and the roof structure or the next higher floor.

Drop ceilings typically have a metal grid of inverted T-bars running in the X and Y axis at substantially right angles to each other, suspended from the actual structure (e.g. next higher floor, walls, etc.) by wires or other support structures. The T-bars are spaced to accommodate standard sized ceiling tiles, for example nominally two feet by two feet or two feet by four feet ceiling tiles or trimmed sizes thereof. The tiles rest on an inside surface of the hat of the inverted-T bar. Air return and/or supply ducts typically originate/terminate in the spaces between the grids and a grille or deflector covers the opening to the air return and/or supply.

The rails and cross members of an inverted-T suspension system are often referred to as T-Bars. The suspension system typically includes main runners and cross runners (cross Tee). The main runners provide support, anchored to a ceiling above the grid and/or to wall brackets. The cross members are inserted between main runners and provide support only for adjacent ceiling tiles. Such systems often have different profiles, referred to as Inverted-T, "H and T," or "Z". The clips described are suited to all forms of suspension systems, even though the description shows only the Inverted-T system.

The Inverted-T suspension system, looking at a cross section as depicted, for example, in FIG. 1, typically has a bulb 1 of rectangular, triangular or round cross section at the top of the vertical section (round cross section is shown). The bulb 1 provides improved load strength. Throughout this description, the vertical section 2 is referred to as the "base" of the inverted-T. A bottom surface of the horizontal portion 3 of the inverted-T is typically covered with a decorative coating and is typically visible from below the ceiling system, though some systems hide the grid. Throughout this description, the bottom surface 3 is referred to as the "hat" 3 of the inverted-T.

The typical building sequence for such a ceiling system is to install the ductwork, then, the grid system, and then the HVAC grilles to the ductwork. In some cases grilles are installed without the final connecting ductwork. In this case air draws through the grilles and into open ends of the duct work above the suspended ceiling. Before or after the rest of the building is complete, the ceiling tiles are installed into the grid system. As discussed, even though the building/room is not complete, the HVAC system is often operated for the comfort of the construction workers or heating/cooling/venting of building components. When the HVAC system is operated during continued construction or thereafter, contaminants such general construction dust, dirt, concrete dust, drywall dust, wood dust, carpet fibers, ceiling tile fibers, composites dust, insulation, etc, are drawn into the HVAC duct and equipment. These contaminants build up in the ducts and equipment, causing dust, mold, odor and efficiency problems for many years after the construction is complete. To combat this, some contractors have placed air filters (either air filter media in bats or pre-made air filters) over the grilles, holding them in place against the grid/grille with wire, wire ties, tape, etc. The wire, wire ties or tape often damage the grid/grille or causes the air filter to seal poorly to the ceiling tile, grid and/or grille, allowing contaminates to enter the duct through gaps or, in some cases, be discharged to the interior space through gaps.

The exemplary filter clip 8 solves these problems without using tape, wire ties, etc. The filter clip 8 has a hook portion 12 that hooks over the base 2 of the inverted-T grid and a filter holding portion 14 that engages with and holds tightly the air filter 16 (framed air filter or air filter media), holding the air filter 16 taut to reduce gaps and spaces. Any hook portion 12 is anticipated that holds the filter clip 8 the base 2 of the inverted-T grid. The hook portion 12 is preferably resilient, in that, as it is pushed over the bulb 1, the hook portion 12 opens slightly then closes around the base 2 of the inverted-T grid.

The filter holding portion 14 is preferably resiliently biased against the air filter 16, in that it is biased in a direction towards the hook portion 12, holding the air filter 16 against the hat 3 of the grid and/or the grill 24. As shown, the arms 10 bias the filter holding portion 14 towards the hook portion 12. Optionally, a pull arm 11 is provided to assist in pulling the filter holding portion 14 away from the hat 3 of the grid or grille 24 for insertion of the air filter 16 between the two. The air filter 16 is held tight to the hat 3 of the grid and/or grille 24. The clip 8 functions equally well in ceiling systems before the ceiling tile 22 is installed or after the ceiling tile 22 is installed, being that, when installed, the ceiling tile 22 rests on the clip 8.

Although not required, it is preferred that the holding portion 14 have a textured or jagged surface (as shown) to prevent the air filter 16 from sliding out from between the holding portion 14 and the hat 3 of the grid and/or grille 24.

Figure 2:
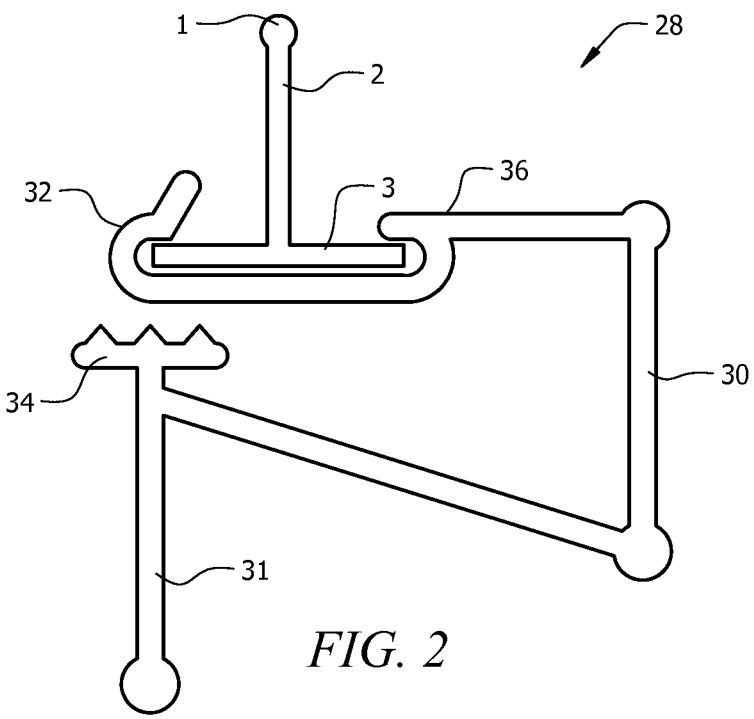
FIG. 2 illustrates a cross-sectional view of a second exemplary filter clip.

Referring to FIG. 2, a cross-sectional view of a second example of the filter clip will be described. In this variation, the clip 28 snaps onto the hat portion 3 of the inverted-T grid. A first side of the hat portion 3 of the grid is inserted onto a first side 36 of the clip 28 and a distal side of the hat portion 3 of the grid snaps into the second side 32 of the clip 28. An arm 30 supports the filter holding portion 34 and urges the filter holding portion 34 towards the second side 32 of the clip 28. Optionally, a pull arm 31 helps an installer pull the filter holding portion 34 away from the second side 32 of the clip 28 for installation of the air filter 16 (see FIG. 1) between the holding portion 34 and the second side 32.

Although not required, it is preferred that the holding portion 34 have a textured or jagged surface (as shown) to prevent the air filter 16 from sliding out from between the holding portion 14 and the body of the clip 28 and/or the hat 3 of the grid and/or the grille 24.

Figure 3:
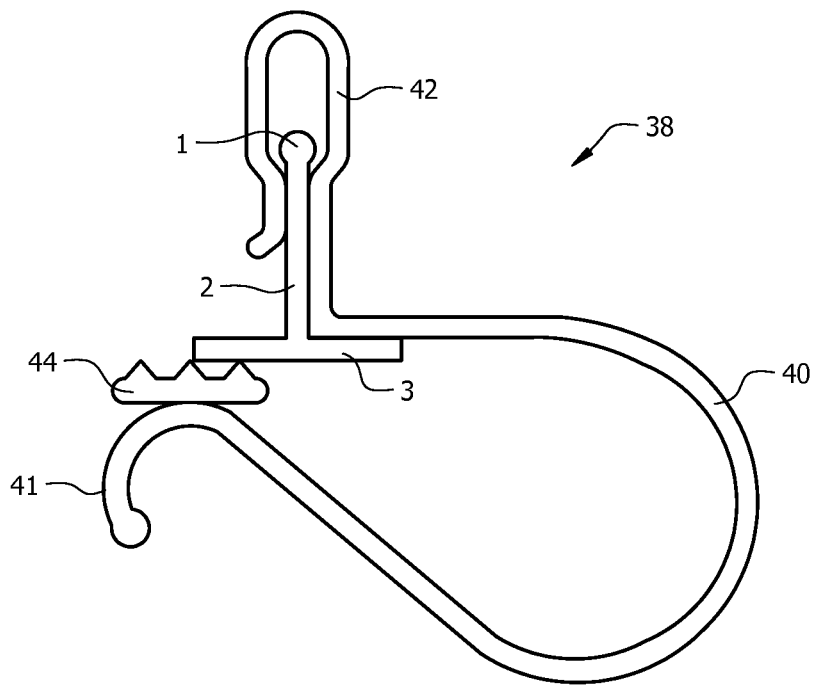
FIG. 3 illustrates a cross-sectional view of a third exemplary filter clip.

Referring to FIG. 3, a cross-sectional view of a third example of a filter clip 38 will be described. In this variation, the hook portion 42 of the clip 38 snaps over the base 2 of the inverted-T grid. Any hook portion 42 is anticipated that holds the filter clip 38 to the base 2 of the inverted-T grid. The hook portion 42 is preferably resilient, in that, as it is pushed over the bulb 1, the hook portion 42 opens slightly then closes around the base 2 of the inverted-T grid.

An arm 40 supports the filter holding portion 44 and urges the filter holding portion 44 towards the hat 3 of the inverted-T grid and/or the grille 24. Optionally, the resilient arm 40 continues to form a pull arm 41 that helps an installer pull the filter holding portion 44 away from the hat 3 of the inverted-T grid and/or grille 24 for installation of the air filter 16 (see FIG. 1) between the filter holding portion 44 and the hat 3 of the inverted-T grid and/or grille 24.

Although not required, it is preferred that the holding portion 44 have a textured or jagged surface (as shown) to prevent the air filter 16 from sliding out from between the holding portion 14 and the hat 3 of the grid and/or grille 24.

Figure 6:
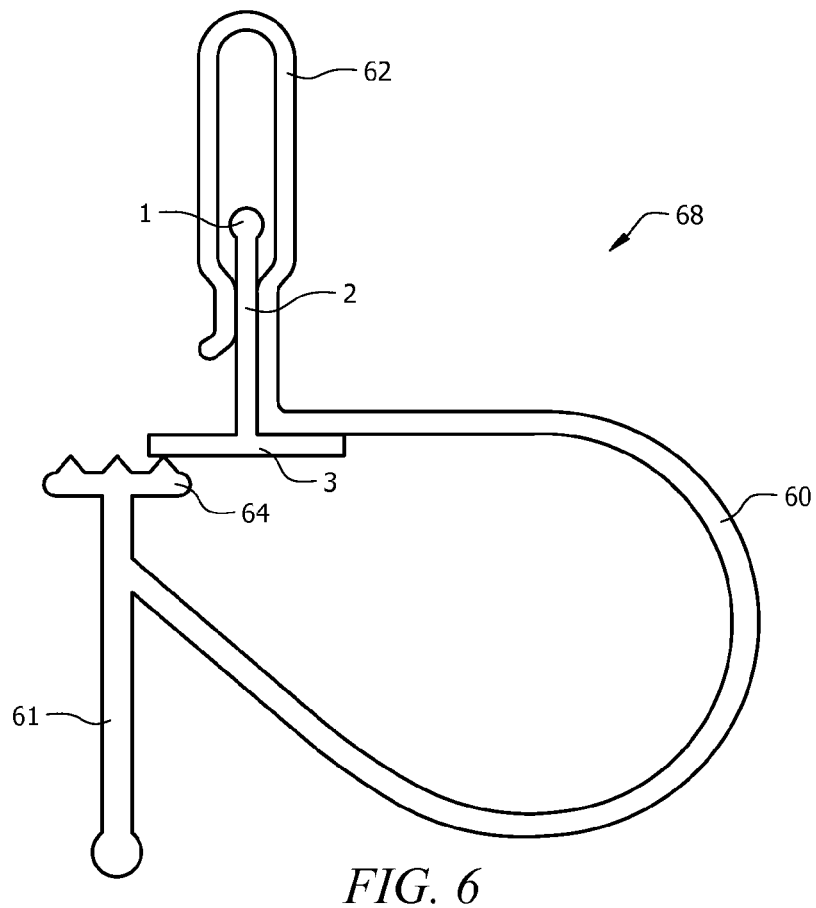
FIG. 6 illustrates a cross-sectional view of a fourth exemplary filter clip.

Referring to FIG. 6, a cross-sectional view of a fourth example of a filter clip 68 will be described. In this variation, the clip 62 snaps over the base 2 of the inverted-T grid. Any hook portion 62 is anticipated that holds the filter clip 68 to the bulb 1 and base 2 of the inverted-T grid. The hook portion 62 is preferably resilient, in that, as it is pushed over the bulb 1, the hook portion 62 opens slightly then closes around the base 2 of the inverted-T grid.

A resilient arm 60 supports the filter holding portion 64 and urges the filter holding portion 64 towards the hat 3 of the inverted-T grid and/or the grille 24. Optionally, a pull arm 61 is interfaced in the area of the filter holding portion 64 to help an installer pull the filter holding portion 64 away from the hat 3 of the inverted-T grid and/or the grille 24 for installation of the air filter 16 (see FIG. 1) between the filter holding portion 64 and the hat 3 of the inverted-T grid and/or the grille 24.

Figure 7:
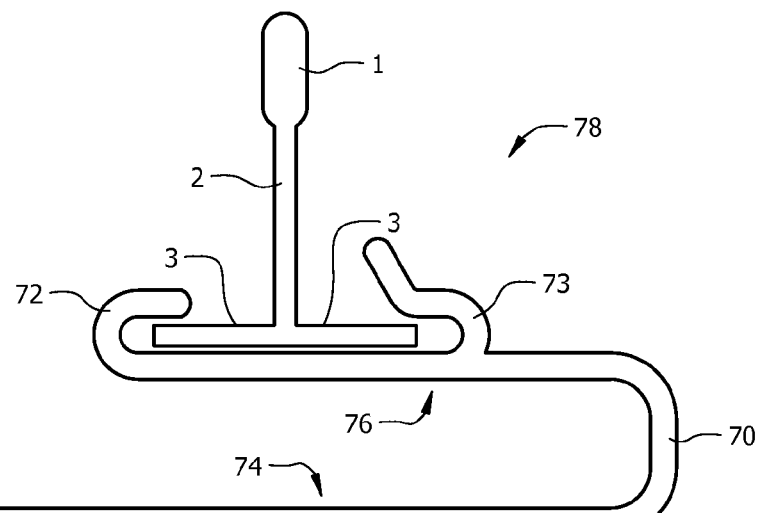
FIG. 7 illustrates a cross-sectional view of a fifth exemplary filter clip.

Referring to FIG. 7, a cross-sectional view of a fifth example of a filter clip 78 is shown. In this, the filter clip 78 snaps over the hat 3 of the inverted-T grid. A first end 72 of the filter clip 78 captures one side of the hat 3 of the inverted-T grid and the other end 73 of the filter clip 78 snaps over the opposing side of the hat 3 of the inverted-T grid, holding the filter clip 78 to the hat 3 of the inverted-T grid. The filter clip 78 continues with a body portion 70 that forms a gap between edges 74/76 in which the filter or filter media is held. It is preferred that the body portion 70 be resilient to urge the edge 74/76 toward each other. Optionally, the continuation of the body portion 70 ends with a pull tab 71 for deforming the body portion 70 so that it resiliently accepts a filter or filter media that is larger than the natural gap between edges 74/76. When the filter 16 or filter media 16 is placed between the edges 74/76, the resiliency of the body portion 70 holds the filter 16 or filter media 16 between the edges 74/76.

Many shapes of clips 8/28/38/68/78 are anticipated, some with smooth, curved transitions and some with sharp, angled transitions.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A filter clip comprising:
   a hook portion, the hook portion securing to a grid of a suspended ceiling system;
   an air filter; and
   a filter holding portion connected to the hook portion such that the filter holding portion is biased towards the grid;
   whereas the air filter placed between the filter holding portion and the grid is held against the grid by the filter holding portion.

2. The filter clip of claim 1, further comprising a pull arm connected to the filter holding portion.

3. The filter clip of claim 1, wherein the air filter is at least one cut section of filter media.

4. The filter clip of claim 1, wherein the air filter is an individually framed air filter.

5. The filter clip of claim 1, wherein the hook portion extends over a base of the grid of the suspended ceiling system.

6. The filter clip of claim 5, wherein the hook portion is resilient and spreads open when pushed over a bulb of the base of the grid.

7. The filter clip of claim 1, wherein the hook portion attaches to a hat of the grid of the suspended ceiling system.

8. The filter clip of claim 1, wherein a surface of the filter holding portion that faces the grid of the suspended ceiling system has a jagged surface.

9. A method of holding an air filter to a grid of a suspended ceiling system, the method comprising:
   providing a clip comprising:
      a hook portion, the hook portion securing to a base of the grid of the suspended ceiling system; and
      a filter holding portion connected to the hook portion such that the filter holding portion is urged towards the hook portion;
   for each clip, installing the hook portion of two or more of the clips onto a base of the grid of the suspended ceiling system at a terminal end of a duct of a HVAC system;
   pulling the filter holding portion away from the hook portion and grid;
   inserting the air filter between the filter holding portion and the grid; and
   releasing the filter holding portion, thereafter the filter holding portion is biased towards the grid, holding the air filter against the grid.

10. The method of claim 9, wherein the clip further comprises a pull arm connected to the filter holding portion and the step of pulling uses the pull arm.

11. The method of claim 9, wherein the air filter is a cut section of filter media.

12. The method of claim 9, wherein the air filter is an individual filter.

13. The method of claim 9, wherein the hook portion clips over the base of the grid of the suspended ceiling system.

14. The method of claim 9, wherein the hook portion attaches to a hat of the grid of the suspended ceiling system.

15. The method of claim 9, wherein a surface of the filter holding portion that faces the grid of the suspended ceiling system has a jagged surface.

16. A filter clip comprising:
   a hook portion, the hook portion clips over a base of a grid of a suspended ceiling system securing the filter clip to the base of the grid; and
   a filter holding portion, the filter holding portion is connected to the hook portion such that the filter holding portion is resiliently biased towards the hook portion, a surface of the filter holding portion that faces the hook portion is jagged for holding a filter media between the grid and the surface;
   whereas the filter media is placed between the surface and the grid and the filter media is held between the surface and the grid.

17. The filter clip of claim 16, further comprising a pull arm connected to the filter holding portion.

18. The filter clip of claim 16, wherein the filter media is at least one cut section of unframed filter media.

19. The filter clip of claim 16, wherein the air filter is an individually framed air filter.

20. The filter clip of claim 16, wherein the hook portion is resilient and spreads open when pushed over a bulb of the base of the grid.

* * * * *